United States Patent
Kent et al.

(10) Patent No.: US 6,849,108 B2
(45) Date of Patent: Feb. 1, 2005

(54) VACUUM CLEANER

(75) Inventors: Andrew Kent, Bromsgrove (GB); Christopher Thomas Elsworthy, Cheltenham (GB)

(73) Assignee: Techtronic Industries Company Limited, Hong Kong (CN)

( * ) Notice: Subject to any disclaimer, the term of this patent is extended or adjusted under 35 U.S.C. 154(b) by 0 days.

(21) Appl. No.: 10/758,301

(22) Filed: Jan. 16, 2004

(65) Prior Publication Data

US 2004/0172783 A1 Sep. 9, 2004

Related U.S. Application Data

(63) Continuation of application No. PCT/GB02/03241, filed on Jul. 15, 2001.

(30) Foreign Application Priority Data

Jul. 16, 2001 (GB) .............................................. 0117272

(51) Int. Cl.[7] ............................................. B01D 35/143
(52) U.S. Cl. .............................. 96/423; 55/337; 55/429; 55/DIG. 3; 55/DIG. 34; 15/339
(58) Field of Search ..................... 96/417, 423; 55/337, 55/429, DIG. 3, DIG. 34, 339, 352

(56) References Cited

U.S. PATENT DOCUMENTS

| 2,742,105 | A | | 4/1956 | Dow |
| 3,745,965 | A | | 7/1973 | Liung et al. |
| 4,044,421 | A | | 8/1977 | Kristenson et al. |
| 5,102,435 | A | * | 4/1992 | Rau et al. ..................... 55/467 |

FOREIGN PATENT DOCUMENTS

| DE | 3434209 A1 | 3/1986 |
| DE | 197 25 990 A1 | 12/1998 |
| DE | 100 21 594 A1 | 11/2001 |
| EP | 839494 A2 * | 5/1998 |
| WO | WO 98/35602 A | 8/1998 |

* cited by examiner

*Primary Examiner*—Robert A. Hopkins
(74) *Attorney, Agent, or Firm*—Venable LLP; Robert Kinberg; Jeffri A. Kaminski

(57) ABSTRACT

A vacuum cleaner includes a removable filter element and an indicator member having a first position when the filter member is removed from the cleaner and a second position when the filter member is in place in the cleaner and being readily visible to a user of the vacuum cleaner in at least one of the first and second positions. When the indicator member is in the first position, the vacuum cleaner cannot be used to collect dust and dirt.

8 Claims, 3 Drawing Sheets

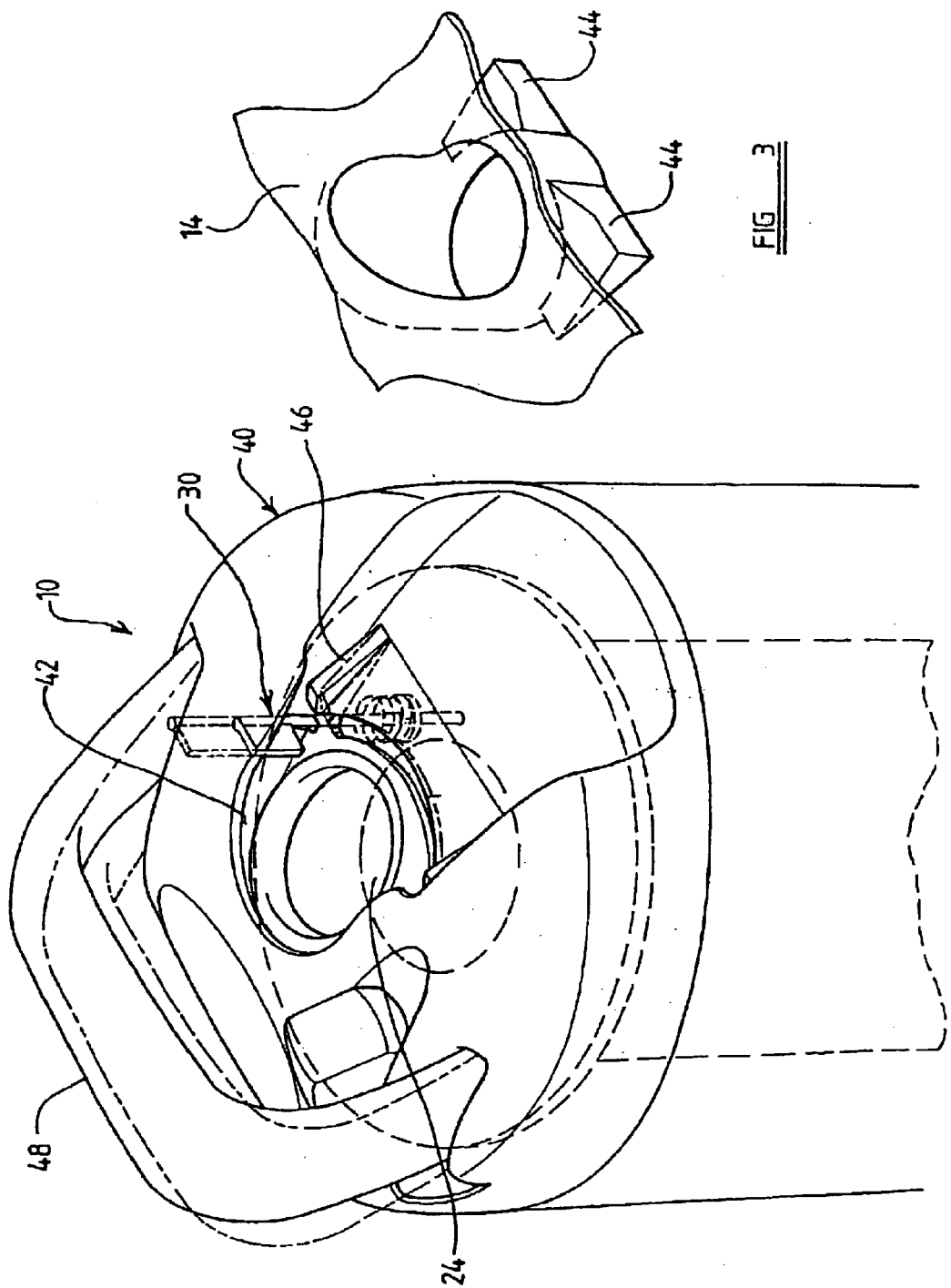

VACUUM CLEANER

CROSS-REFERENCE TO RELATED APPLICATION

This application is a continuation of the International Application No. PCT/GB02/03241 filed on Jul. 15, 2002, designating the United States and claiming the priority of the Great Britain Application No. 0117272.5 filed on Jul. 16, 2001, the subject matter of each application being incorporated herein by reference.

BACKGROUND OF THE INVENTION

The invention relates to a vacuum cleaner of the kind having a removable filter, and in particular although not exclusively to such a vacuum cleaner having a dust and dirt separation assembly which is itself removable and which includes the filter.

Most forms of vacuum cleaner include some kind of removable filter member located between the inlet for the dirty air and the motor which provides the suction. Such filters become blocked with dust and dirt during use of the cleaner and thus need to be removed periodically for cleaning or replacement, depending on their kind. Some users may then omit to replace the filter, either deliberately or by mistake, before using the cleaner. However, using the cleaner without the filter member in place can lead to damage to the motor if significant quantities of dust are permitted to enter it, and also results in much of the dust which should be filtered re-entering the atmosphere.

In U.S. Pat. No. 4,044,421, a cleaner and disposable dust bag combination is described in which the cleaner cannot be closed without the dust bag in place, and thus cannot be used unless a dust bag is correctly fitted.

SUMMARY OF THE INVENTION

It is an object of the present invention to mitigate the above identified problem.

According to the present invention, there is provided a vacuum cleaner including a removable dust and dirt separation assembly, the assembly having a dirty air inlet and a clean air outlet with an airflow path therebetween, the air flow path passing through a first separation means for separating larger particles of dirt from the dirty air, and a second separation means comprising a removable filter element for separating smaller particles of dust from the dirty air, and an air flow conduit with a first end for connection to the clean air outlet of the assembly and a second end for connection to a source of suction. The vacuum cleaner further includes an indicator member having a first position when the filter element is removed from the cleaner and a second position when the filter element is in place in the cleaner, the indicator member being readily visible to a user of the vacuum cleaner in at least one of the first and second positions. When said indicator is in said first position, the vacuum cleaner cannot be used to collect dust and dirt.

The invention provides the advantage that the user can readily see whether the filter element is in place within the cleaner when they come to use it.

The vacuum cleaner may further include a removable dust and dirt separation assembly, the assembly having a dirty air inlet and a clean air outlet with an airflow path therebetween, the air flow path passing through a first separation means for separating larger particles of dirt from the dirty air, and a second separation means comprising the removable filter element for separating smaller particles of dust from the dirty air, and an air flow conduit with a first end for connection to the clean air outlet of the assembly and a second end for connection to a source of suction, and the assembly may further include the indicator member.

Preferably the indicator member is biased to the first position. Conveniently the indicator member is biased by means of a spring member.

Preferably when the indicator member is in its first position the assembly cannot be connected to the vacuum cleaner.

This provides the advantage that, even if the user does not notice that the indicator member is showing that the filter member is not within the assembly, the assembly cannot be connected to the vacuum cleaner and thus the motor is protected from damage in a way in which it would not be in the prior art.

The indicator member may be located such that when it is in its first position it obstructs the connection of the clean air outlet to the first end of the air flow conduit.

The clean air outlet may include a receiving formation for receipt of retaining formations of the first end of the air flow conduit, and the indicator member when in its first position is partially located within the receiving formation.

Preferably the indicator member is moved from the first position to the second position when the filter member is installed into the assembly.

The assembly may conveniently be of the kind which further comprises a dirt collection chamber where the dirt separated by the first separation means is collected.

BRIEF DESCRIPTION OF THE DRAWINGS

An embodiment of the invention will now be described, by way of example only, with reference to the accompanying drawings in which:

FIG. 3 is a perspective view of the top of the dust and dirt assembly and the first end of the air flow conduit separated for clarity.

DETAILED DESCRIPTION OF THE INVENTION

Figure 1:
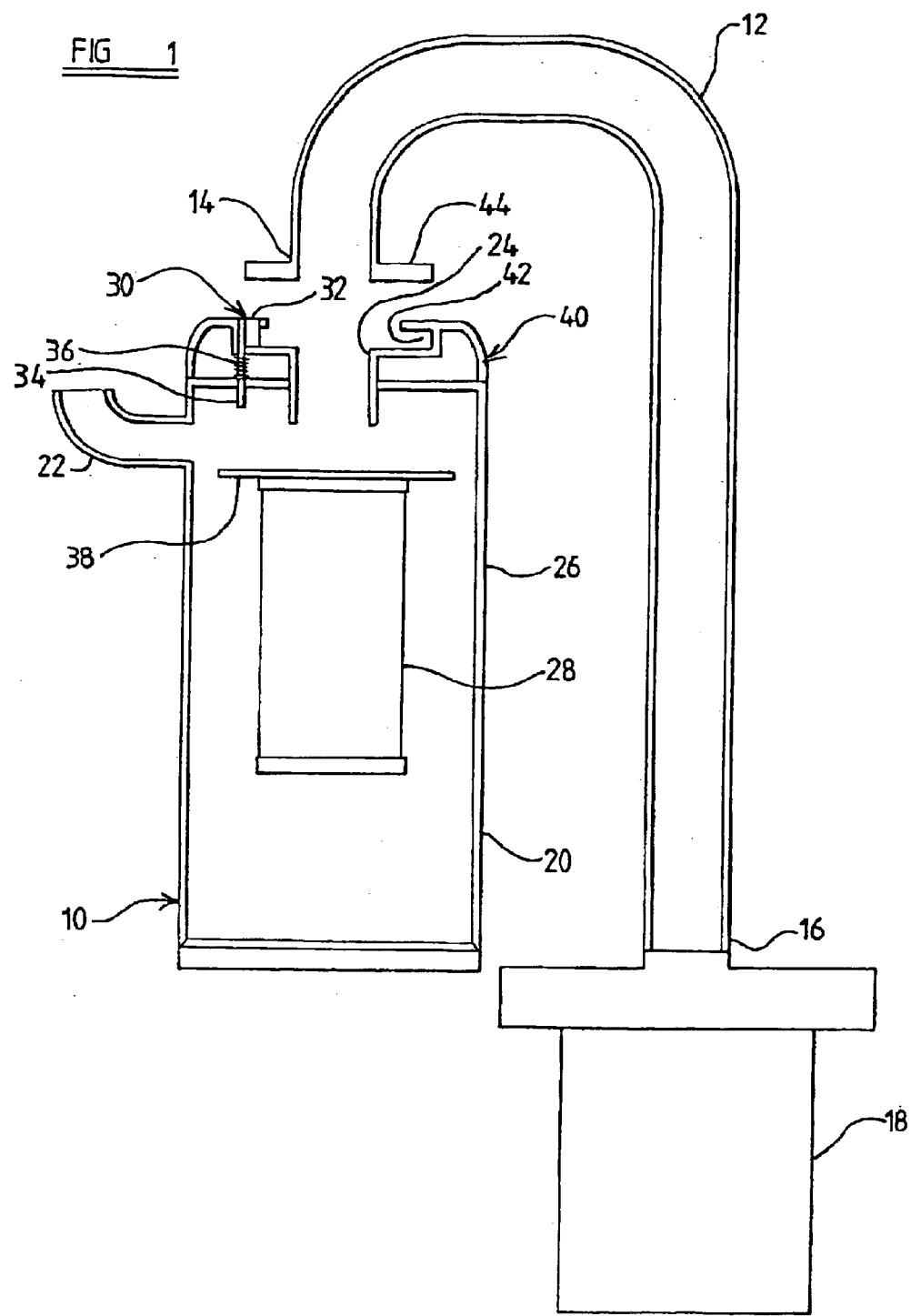
FIG. 1 is a schematic illustration of parts of a vacuum cleaner according to the invention with the dust and dirt assembly removed.

A vacuum cleaner includes a dust and dirt assembly 10, an air flow conduit 12 with a first end 14 and a second end 16, and a motor 18 providing a source of suction. The dust and dirt assembly 10 comprises a dirt collection chamber 20, a dirty air inlet 22 and a clean air outlet 24 with an airflow path therebetween, the air flow path passing through a first separation means 26 for separating larger particles of dirt from the dirty air such that it is collected in the dirt collection chamber, and a second separation means comprising a removable filter element 28 for separating smaller particles of dust from the dirty air. The first separation means 26 is in this embodiment a cyclone separator, although it could take other forms such as a traditional bag.

The assembly 10 also includes an indicator member 30 adjacent to the clean air outlet 24. The indicator member 30 comprises a flag portion 32 which extends outwardly of the assembly 10, and a leg portion 34 which passes through into the interior of the assembly 10, and around which is provided a biasing means in the form of a spring member 36. The indicator member 30 has a first position shown in FIG. 1 (and in solid lines in FIG. 3), to which it is biased by spring member 36, and a second position shown in FIG. 2 (and in broken lines in FIG. 3).

The assembly 10 further comprises a cap portion 40 which includes the clean air outlet 24, and surrounding that a receiving formation in the form of a groove 42 for receipt of engagement formations 44 on the first end 14 of the air flow conduit 12. When the first end 14 of the air flow conduit 12 is located within the groove 42, it is retained there by biased lugs 46. When it is desired to remove the assembly 10 from the vacuum cleaner, these lugs 46 are released by depressing handle 48 to the position shown in the broken lines in FIG. 3.

When the filter member 28 is removed from the assembly 10, the spring member 36 biases the indicator member 30 to the first position. However, when the filter member 28 is located correctly within the assembly 10, a flange 38 around its upper end engages on the leg portion 34 of the indicator member 30 and pushes it upwards against the bias of the spring member 36 into its second position.

The first position of the indicator member 30 is such that the flag portion 32 is located within the groove 42, thus obstructing the insertion of the first end 14 of the air flow conduit 12, and not clearly visible to the user. Thus the user can readily see that the filter member 28 must not be present in the assembly 10, and furthermore, even if they do not notice that, the assembly 10 cannot be connected to the vacuum cleaner for use and thus the vacuum cleaner cannot be used to collect dust and dirt.

Figure 2:
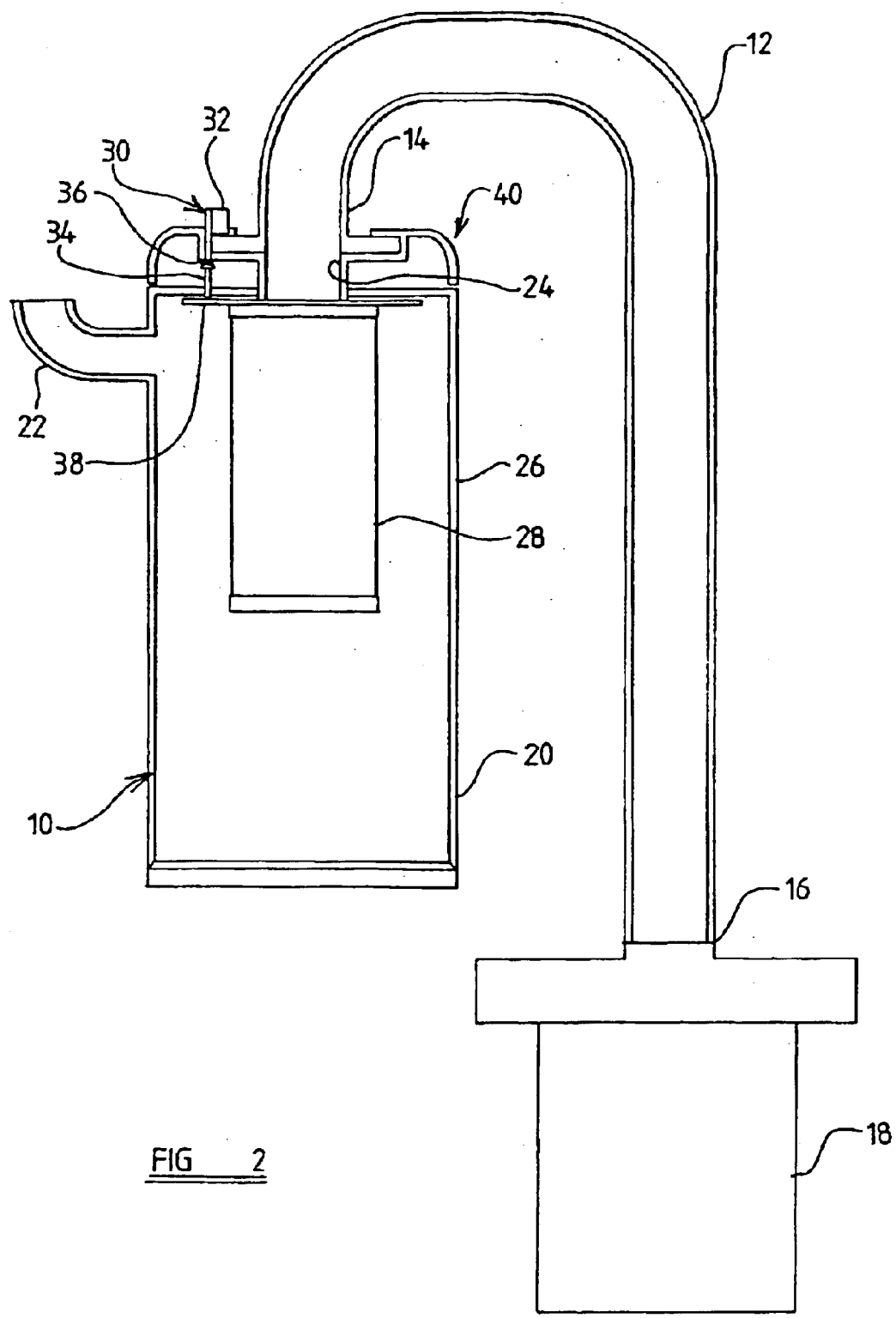
FIG. 2 is a schematic illustration of parts of a vacuum cleaner according to the invention with the dust and dirt assembly connected.

The second position of the indicator member 30 is such that the flag portion 32 is raised up above the cap portion 40 of the assembly 10 and thus is both clearly visible to the user and no-longer obstructs the groove 42. Thus, the user can readily see that the filter member 28 is in place and can connect the assembly 10 to the vacuum cleaner as shown in FIG. 2.

The provision of the indicator member 30 provides two distinct advantages over the prior art. First, the user can clearly see when the filter member 28 is not in place within the assembly 10. Second, the assembly 10 cannot be connected to the vacuum cleaner without the filter member 28 being in place in the assembly 10, and thus, damage cannot be done to the motor 18 as readily as in the prior art.

Although a single embodiment of a vacuum cleaner incorporating the invention has been described it will be appreciated that the invention may take many forms.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A vacuum cleaner comprising:
    a removable dust and dirt separation assembly comprising:
        a dirty air inlet for dirty air,
        a clean air outlet,
        an airflow path between the dirty air inlet and the clean air outlet, and
        a first separation means and a second separation means disposed in the airflow path, the first separation means separating larger particles of dirt from the dirty air and the second separation means comprising a removable filter element for separating smaller particles of dust from the dirty air;
    an air flow conduit having a first end arranged to be connected to the clean air outlet and a second end arranged to be connected to a source of suction; and
    an indicator member having a first position when the removable filter element is removed from the vacuum cleaner and a second position when the removable filter element is placed in the vacuum cleaner, wherein the indicator element is readily visible to a user of the vacuum cleaner in at least one of the first and second positions, and the vacuum cleaner is incapable of collecting dust and dirt when the indicator is in the first position.

2. The vacuum cleaner of claim 1, wherein the indicator member is biased to the first position.

3. The vacuum cleaner of claim 2, further comprising a spring member for biasing the indicator member to the first position.

4. The vacuum cleaner of claim 1, wherein the removable dust and dirt separation assembly is arranged to be incapable of being connected to the vacuum cleaner when the indicator member is in the first position.

5. The vacuum cleaner of claim 4, wherein the indicator member is arranged to obstruct the connection of the clean air outlet to the first end of the air flow conduit when the indicator member is in the first position.

6. The vacuum cleaner of claim 5, wherein the clean air outlet includes a receiving formation arranged to receive retaining formations of the first end of the air flow conduit, and the indicator member in the first position is partially located within the receiving formation.

7. The vacuum cleaner according to claim 1, wherein the indicator member includes means for moving the indicator member from the first position to the second position when the filter element is installed into the removable dust and dirt separation assembly.

8. The vacuum cleaner of claim 1, wherein the removable dust and dirt separation assembly further comprises a dirt collection chamber to collect the removable dust and dirt separated by the first separation means.

* * * * *